June 30, 1931.        D. F. SPROUL                1,812,723
                     BOLSTER SUPPORT
            Original Filed Oct. 30, 1929    2 Sheets-Sheet 1
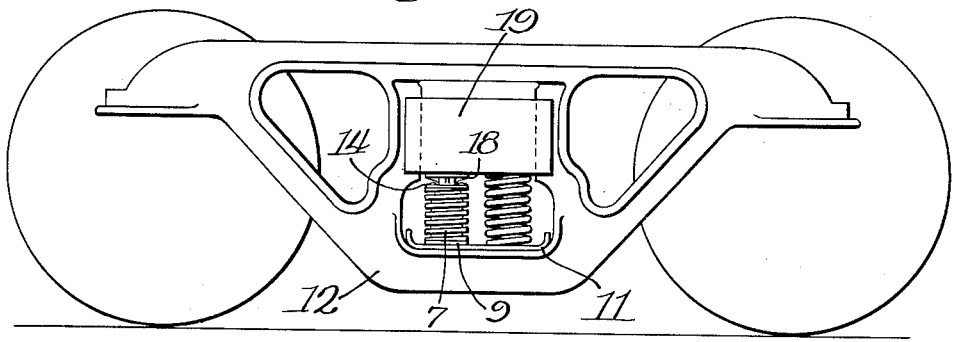
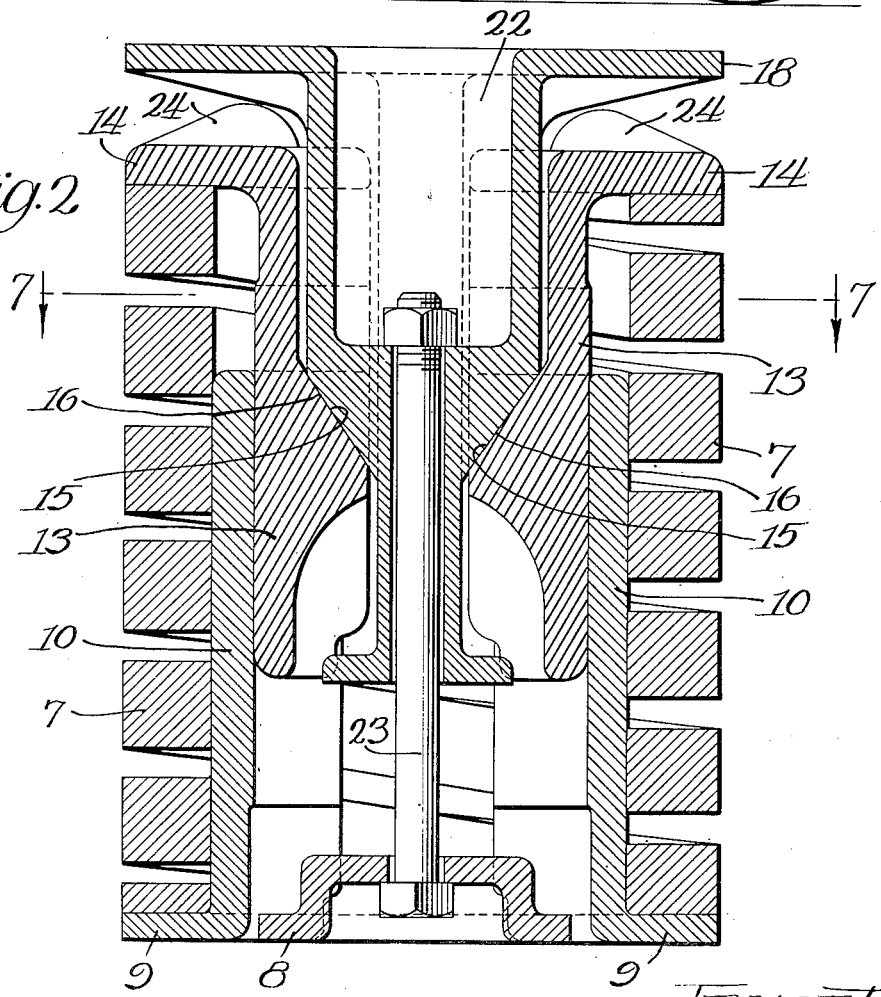
Inventor
Donald F. Sproul

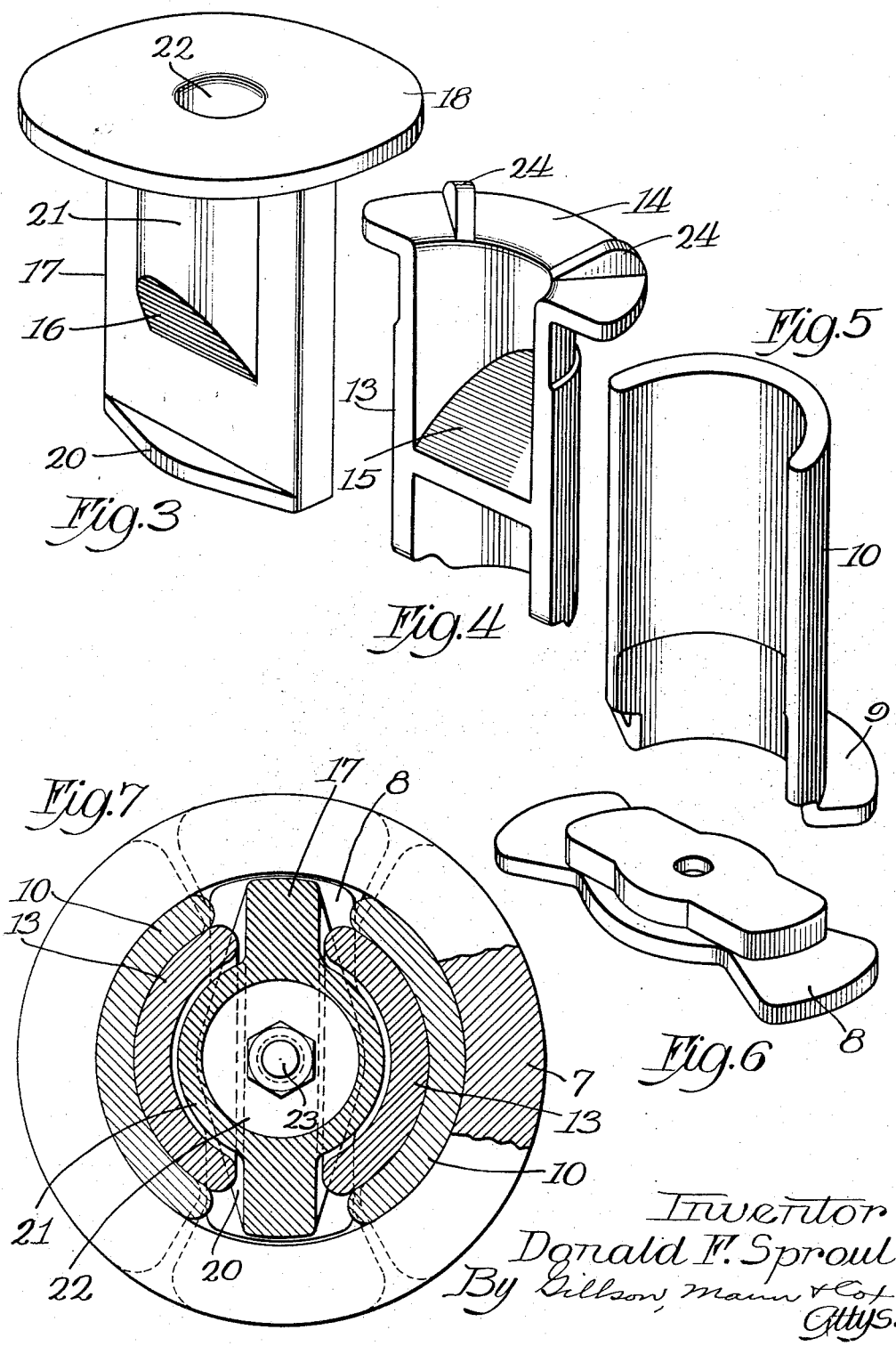

Patented June 30, 1931

1,812,723

UNITED STATES PATENT OFFICE

DONALD F. SPROUL, OF CHICAGO, ILLINOIS, ASSIGNOR TO CARDWELL WESTINGHOUSE COMPANY, A CORPORATION OF DELAWARE

BOLSTER SUPPORT

Application filed October 30, 1929, Serial No. 403,421. Renewed November 7, 1930.

The invention relates to bolster supports of the friction type, its objects being to secure, with simplicity of structure, high efficiency and smoothness of operation.

In the accompanying drawings, illustrating the invention,

Fig. 1 is a detail, side view of a railway car truck;

Fig. 2 is a longitudinal, central section of the device;

Figs. 3, 4, 5 and 6 are views in perspective of various of the elements of the device; and Fig. 7 is a sectional view on the line 7—7 of Fig. 2.

The improved device comprises a spring 7 having the inner faces of its several turns flattened, the spring ordinarily being formed of a rod of square section.

The lower end of this spring rests upon a seat 8 and upon outstanding flanges 9 of a pair of friction shoes 10, the parts 8 and 9 being adapted to rest upon the spring plate 11 which is carried by the lower arch 12 of the side frame of the truck. The body portions of the shoes 10, which are segmental in form, bear against the inner faces of the lower turns of the spring, their inner faces being frictionally engaged by a pair of wedge shoes 13 having lateral flanges 14 at their upper ends which bear upon the opposite end of the spring 7.

The inner faces of the shoes 13 carry forwardly and inwardly inclined wedge surfaces 15 which cooperate with complementary wedge surfaces 16 formed on the stem 17 of a follower plate 18 adapted to seat against the lower face of the truck bolster 19.

The stem 17 is prolonged beyond the wedges and forms a limiting stop for the device by making contact with the seat 11 upon full compression and in order to provide ample bearing for this purpose, the stem is provided at its lower end with lateral flanges 20.

The upper portion of the stem 17 is centrally enlarged, as shown at 21, to enclose a chamber 22 which opens through the follower plate 18. A bolt 23 setting longitudinally and centrally through an aperture in the lower portion of the stem 17 and the aperture in the seat 8 ties the various parts together for convenience in shipment. As shown, the flanges 14 of the wedge shoes are reinforced by upstanding bosses 24.

When supporting an empty car, the device is but slightly compressed. As the car is loaded, there is further compression of the spring coupled with an increase in the outward pressure upon the shoes 13. Any shocks, such as are due to inequalities in the track are absorbed by the friction between the shoes 10 and 13 and between the forward and the inner faces of the various coils of the spring with which they engage, plus the spring resistance. The recoil is provided for by the expansion of the spring and the frictional resistance is reduced by the relief of the excess pressure upon the follower 18.

The device may constitute the entire support of the bolster or may be associated with one or more similar devices or with the springs which are ordinarily used.

Various changes in the form and arrangement of various elements of the gear, from those disclosed and described, may be made within the scope of the invention as defined in the appended claims.

I claim as my invention:

1. In a bolster support in combination, a spring having the inner faces of its several turns flattened, a spring seat, a pair of segmental friction shoes engaging the inner face of the spring and each having an outstanding flange engaging the spring end, a pair of wedge shoes engaging the inner faces of the friction shoes and each having an outstanding flange engaging the opposite end of the spring and a forwardly and inwardly inclined wedge face, and a follower facing and spaced from the wedge shoe flanges and having a wedging stem cooperating with the wedge faces of such shoes.

2. In a bolster support in combination, a spring formed of a bar of square section, a spring seat, a pair of segmental friction shoes engaging the inner face of the spring and each having an outstanding flange engaging the spring end, a pair of wedge shoes engaging the inner faces of the friction shoes and each having an outstanding flange engaging the opposite end of the spring and a forwardly and inwardly inclined wedge face, and a follower facing and spaced from the wedge shoe flanges and having a wedging stem cooperating with the wedge faces of such shoes.

3. In a bolster support, in combination, a spring having the inner faces of its several turns flattened, a spring seat, a pair of segmental friction shoes engaging the inner face of the spring and each having an outstanding flange engaging the spring end, a pair of wedge shoes engaging the inner faces of the friction shoes and each having an outstanding flange engaging the opposite end of the spring and a forwardly and inwardly inclined wedge face, and a follower facing and spaced from the wedge shoe flanges and having a wedging stem cooperating with the wedge faces of such shoes, such stem being engageable with the spring seat as a limiting stop.

4. In a bolster support, in combination, a spring having the inner faces of its several turns flattened, a pair of segmental friction shoes engaging the inner face of the spring and each having an outstanding flange engaging the spring end, a pair of wedge shoes engaging the inner faces of the friction shoes and each having an outstanding flange engaging the opposite end of the spring and a forwardly and inwardly inclined wedge face, and a follower facing and spaced from the wedge shoe flanges and having a wedging stem cooperating with the wedge faces of such shoes.

5. In a bolster support, in combination, a spring formed of a bar of square section, a pair of segmental friction shoes engaging the inner face of the spring and each having an outstanding flange engaging the spring end, a pair of wedge shoes engaging the inner faces of the friction shoes and each having an outstanding flange engaging the opposite end of the spring and a forwardly and inwardly inclined wedge face, and a follower facing and spaced from the wedge shoe flanges and having a wedging stem cooperating with the wedge faces of such shoes.

6. In a bolster support, in combination, a helical spring, two sets of overlapping cooperating segmental friction plates anchored, respectively, to the opposite ends of the spring, the outer plates having frictional bearing against the inner face of the spring and the inner plates having wedge faces on their inner surfaces, and a thrust element projecting beyond one end of the spring and extending into the barrel thereof and having wedge faces cooperating with the wedge faces of the inner set of friction plates.

7. In a bolster support, in combination, a helical spring, two sets of overlapping cooperating segmental friction plates anchored, respectively, to the opposite ends of the spring, the outer plates having frictional bearing against the inner face of the spring and the inner plates having wedge faces on their inner surfaces, a thrust element projecting beyond one end of the spring and extending into the barrel thereof and having wedge faces cooperating with the wedge faces of the inner set of friction plates, and a spring seat cooperating with the end of the spring opposite to that from which the thrust member projects.

8. In a bolster support, in combination, a helical spring, two sets of overlapping cooperating segmental friction plates anchored, respectively, to the opposite ends of the spring, the outer plates having frictional bearing against the inner face of the spring and the inner plates having wedge faces on their inner surfaces, and a thrust element projecting beyond one end of the spring and extending into the barrel thereof and having wedge faces cooperating with the wedge faces of the inner set of friction plates and having at its projecting end a laterally extending flange overlapping and normally spaced from the friction plates to interlock with the adjacent end of the spring.

In testimony whereof I affix my signature.

DONALD F. SPROUL.